United States Patent
Kotecha et al.

(10) Patent No.: US 7,602,837 B2
(45) Date of Patent: Oct. 13, 2009

(54) BEAMFORMING FOR NON-COLLABORATIVE, SPACE DIVISION MULTIPLE ACCESS SYSTEMS

(75) Inventors: Jayesh H. Kotecha, Austin, TX (US); Jayakrishnan C. Mundarath, Madison, WI (US)

(73) Assignee: Freescale Semiconductor, Inc., Austin, TX (US)

( * ) Notice: Subject to any disclaimer, the term of this patent is extended or adjusted under 35 U.S.C. 154(b) by 637 days.

(21) Appl. No.: 11/254,392

(22) Filed: Oct. 20, 2005

(65) Prior Publication Data

US 2007/0092019 A1    Apr. 26, 2007

(51) Int. Cl.
*H04B 1/69* (2006.01)
*H04B 7/02* (2006.01)

(52) U.S. Cl. ........................ 375/148; 375/267

(58) Field of Classification Search ............... 375/148, 375/130, 267, 347, 349, 299; 370/342, 203, 370/299; 455/101, 132
See application file for complete search history.

(56) References Cited

U.S. PATENT DOCUMENTS 5,909,649 A    6/1999    Saunders ................ 455/450

2006/0155798 A1* 7/2006 Ketchum et al. ........... 708/607
2007/0223619 A1* 9/2007 Lee et al. ................ 375/267
2007/0286304 A1* 12/2007 Kim et al. ................ 375/267

OTHER PUBLICATIONS

D.J. Love et al., "Grassmannian Beamforming for Multiple-Input Multiplt-Output Wireless Systems," IEEE, 2003.
L. Dong et al., "Opportunistic Transmission Scheduling for Multiuser MIMO Systems," IEEE, 2003.

(Continued)

*Primary Examiner*—Khai Tran
(74) *Attorney, Agent, or Firm*—Hamilton & Terrile, LLP; Michael Rocco Cannatti

(57) ABSTRACT

A wireless communication system noncollaborative, multiple input, multiple output (MIMO) space division multiple access (SDMA) system determines subscriber station combining and weighting vectors that yield a high average signal-to-interference plus noise ratio (SINR). Each subscriber station independently transmits information to a base station that allows the base station to determine a weight vector $w_i$ for each subscriber station using the determined combining vector of the subscriber station. The $i^{th}$ combining vector corresponds to a right singular vector corresponding to a maximum singular value of a channel matrix between a base station and the $i^{th}$ subscriber station. Each subscriber station transmits signals using a weight vector $\underline{v}_i$, which corresponds to a left singular vector corresponding to a maximum singular value of a channel matrix between the $i^{th}$ subscriber station and the base station. The base station uses the weight vector $w_i$ to determine the signal transmitted by the $i^{th}$ subscriber station.

20 Claims, 8 Drawing Sheets

OTHER PUBLICATIONS

H. Shin et al., "Closed-form Formulas for Ergodic Capacity of MIMO Rayleigh Fading Channels," IEEE, 2003.

M. Torlak et al., "Fast Estimation of Weight Vectors to Optimize Multi-Transmitter Broadcast Channel Capacity," IEEE Transactions on Signal Processing, vol. 46, No. 1, Jan. 1998.

V. Zaharov et al., "Smart Antenna Application for Satellite Communication Systems with Space Division Multiple Access," Journal of Radio Electronics, N. 2, Feb. 5, 2001, printed Oct. 18, 2005.

M. Cooper et al., "Intelligent Antennas: Spatial Division Multiple Access," 1996 Annual Review of Communications.

G.J. Foschini et al., On Limits of Wireless Communication in a Fading Environment when Using Multiple Antennas, Wireless Personal Communications, vol. 6, 1998, pp. 311-335. http://www1.bell-labs.com/project/blast/wpc-v6n3.pdf.

S.V. Bana et al., "Space Division Multiple Access (SDMA) for Robust Ad hoc Vehicle Communication Networks," The IEEE Fourth International Conference on Intelligent Transportation Systems, 2001 IEEE Intelligent Transportation Systems.

D.J. Love et al., "Grassmannian Beamforming on Correlated MIMO Channels," IEEE Global Telecommunications Conference, Nov. 3 - Dec. 3, 2004.

A. Bourdoux et al., "Joint TX-RX Optimisation for MIMO-SDMA Based on a Null-space Constraint," 2002 IEEE 56th Vehicular Technology Conference.

R. Monzingo et al., Introduction to Adaptive Arrays, Chapter 3, John Wiley & Sons, 1980, pp. 78-151.

A.F. Anguib et al., Performance of Wireless CDMA with M-ary Orthogonal Modulation and Cell Site Antenna Arrays, IEEE, Journal on Selected Areas in Communications, vol. 14, No. 9, Dec 1996.

* cited by examiner

BEAMFORMING FOR NON-COLLABORATIVE, SPACE DIVISION MULTIPLE ACCESS SYSTEMS

BACKGROUND OF THE INVENTION

1. Field of the Invention

The present invention relates in general to the field of information processing, and more specifically to a system and method for beamforming for non-collaborative, space division multiple access systems with transmitter and receiver antenna arrays.

2. Description of the Related Art

The demand for wireless communication systems continues to expand. Wireless communication systems transmit and receive signals within a designated electromagnetic frequency spectrum. The capacity of the electromagnetic frequency spectrum is limited. Thus, the usage expansion of wireless communication systems continually introduces challenges to improve spectrum usage efficiency. Space division multiple access (SDMA) represents one approach to improving spectrum usage efficiency. SDMA has recently emerged as a popular technique for the next generation communication systems. SDMA based methods have been adopted in several current emerging standards such as IEEE 802.16 and the 3rd Generation Partnership Project (3GPP).

FIG. 1 depicts a wireless communication system 100 that employs SDMA. The communication system 100 is a multiple-input multiple-output (MIMO) system. In MIMO systems, transmitters and receivers are both equipped with multiple antennas. The wireless communication system 100 includes multiple base stations (BS's) 102.1 through 102.p and multiple subscriber stations (SS's) 104.1-104.r, where "p" and "r" are integers representing the number of base stations and subscriber stations, respectively, in a given geographic area. Base stations and subscriber stations can be both transmitters and receivers when both base stations and subscriber stations are equipped with a receiver and a transmitter. Base stations generally communicate with multiple subscriber stations. Subscriber stations communicate directly with a base station and indirectly, via the base station, with other subscriber stations. The number of base stations depends in part on the geographic area to be served by the wireless communication system 100. Subscriber systems can be virtually any type of wireless one-way or two-way communication device such as a cellular telephones, wireless equipped computer systems, and wireless personal digital assistants. The signals communicated between base stations and subscriber stations can include voice, data, electronic mail, video, and other data, voice, and video signals.

In a MIMO system, each base station 102 and subscriber station 104 includes an array of antennas for transmitting and receiving signals. SDMA-MIMO wireless communication systems utilize a base station with an array of multiple antennas to transmit to and receive signals from subscriber stations. The antenna array forms a beam by applying a set of weights to signals applied to each antenna in the antenna array. A different set of beam forming weights is applied to communications between the base station and each subscriber station with a goal of minimizing interference between the radio communication devices signals. In some transmission schemes, such as time division duplex (TDD), beam forming between the base station and subscriber stations allows the allocation of the same frequency channel and different time channel to subscriber stations during downlink and uplink. In other transmission schemes, such as frequency division duplex (FDD), beam forming between the base station and subscriber stations allows the allocation of the same time channel and different frequency channel to subscriber stations during downlink and uplink. In SDMA, separation between different subscriber stations sharing the same time-frequency channel occurs in the spatial dimension.

FIG. 2 depicts base station 202 and subscriber stations 204.1 through 204.m in an SDMA, MIMO wireless communication system. Base station 202 represents each of base stations 102.1 through 102.p, and subscriber stations 204.1 through 204.m represent any group of m subscriber stations. MIMO systems use beamforming to transmit a single data stream through multiple antennas, and the receiver combines the received signal from the multiple receive antennas to reconstruct the transmitted data. In general, "beamforming" processes a signal using weight vector and an array of antennas to direct the signal using interference properties.

Base station 202 has an array of N antennas 206, where N is an integer greater than or equal to m. The base station prepares a transmission signal, represented by the vector $x_i$, for each signal $s_i$, where $i \in \{1, 2, \ldots, m\}$. The transmission signal vector $x_i$ is determined in accordance with Equation [1]:

$$x_i = w_i \cdot s_i \qquad [1]$$

where $w_i$, is the $i^{th}$ beamforming, N dimensional transmission weight vector (also referred to as a "transmit beamformer"), and each coefficient $w_j$ of weight vector $w_i$ represents a weight and phase shift on the $j^{th}$ antenna 206, where $j \in \{1, 2, \ldots, k_i\}$, and $k_i$ represents the number of receiving antennas of the $i^{th}$ subscriber station 204.i. "$s_i$" is the data to be transmitted to the $i^{th}$ receiver. The coefficients of weight vector $w_i$ is often a complex weight. Unless otherwise indicated, transmission beamforming vectors are referred to as "weight vectors", and reception vectors are referred to as "combining vectors".

The transmission signal vector $x_i$ is transmitted via a channel represented by a channel matrix $H_i$. The channel matrix $H_i$ represents a channel gain between the transmitter antenna array 206 and the $i^{th}$ subscriber station antenna array 208.i. Thus, the channel matrix $H_i$ can be represented by a $k_i \times N$ matrix of complex coefficients, where $k_i$ is the number of antennas in the $i^{th}$ subscriber station antenna array 208.i. The value of $k_i$ can be unique for each subscriber station. The coefficients of the channel matrix $H_i$ depend, at least in part, on the transmission characteristics of the medium, such as air, through which a signal is transmitted. Several conventional methods exist to determine the channel matrix $H_i$ coefficients. In at least one embodiment, a known pilot signal is transmitted to a receiver, and the receiver, knowing the pilot signal, estimates the coefficients of the channel matrix $H_i$ using well-known pilot estimation techniques. In at least one embodiment, the actual channel matrix $H_i$ is known to the receiver and may also be known to the transmitter.

Each subscriber station 204 receives signals on the antennas of each subscriber station. The received signals for the $i^{th}$ subscriber station 204.i are represented by a $k_i \times 1$ received signal vector $y_i$ in accordance with Equation [2]:

$$y_i = s_i H_i^H w_i + \left( \sum_{n=1}^{m} s_n H_i^H w_n - s_i H_i^H w_i \right) \qquad [2]$$

where "$s_i$" is the data to be transmitted to the $i^{th}$ subscriber station 204.i, "$s_n$" is the data transmitted to the $n^{th}$ subscriber station 204.n, "$H_i^H$" represents the complex conjugate of the channel matrix correlating the subscriber station 204 and $i^{th}$ subscriber station 204.i, $w_i$ is the $i^{th}$ base station weight vector, and $w_n$ is the $n^{th}$ base station 202.n weight vector. The superscript "H" is used herein as a hermitian operator to represent a complex conjugate operator. The $j^{th}$ element of the received signal vector $y_i$ represents the signal received on the $j^{th}$ antenna of subscriber station 204.i, $j \in \{1, 2, \ldots, k_i\}$. The first term on the right hand side of Equation [2] is the desired receive signal while the summation terms less the desired receive signal represent co-channel interference.

To obtain a data signal, $z_i$, which is an estimate of the transmitted data $s_i$, the subscriber station 204.i combines the signals received on the k antennas using a combining vector $v_i$ in accordance with Equation [3]:

$$z_i = \hat{s}_i = v_i^H y_i \qquad [3].$$

MIMO-SDMA communication methods can be classified into two major categories: (1) collaborative and (2) non-collaborative. Collaborative MIMO-SDMA methods entail all schemes where the weighting vectors $w_i$ and combining vectors $v_i$ of base station 202 and subscriber station 204.i are designed together in a collaborative fashion, i.e. the knowledge of MIMO channels to all the subscriber stations 204 are used centrally to jointly design the base station 202 weighting and combining vectors and each subscriber station 204. Non-collaborative methods on the other hand employ sequential design, i.e. either the base station 202 or the subscriber stations 204 design their weighting or combining vectors first and knowledge of the designed vectors are used to design the remaining set of vectors.

The signal throughput capacity of collaborative SDMA systems is conventionally greater than the capacity of non-collaborative systems since collaborative systems benefit from the joint knowledge of the channels $H_i$, $i \in \{1, 2, \ldots m\}$, to all the subscriber stations 204 while combining vectors for one subscriber station 204.i in the non-collaborative systems are determined independently of the other subscriber stations 204.

Collaborative systems exhibit downsides including:

Feed forward control information—SDMA systems involve feedback of some information from each subscriber station 204*i* to the base station 202 that allows a base station 202 to know or determine channel information. In collaborative systems, the base station 202 uses this channel information to design both the base station 202 and the subscriber station 204*i* beamforming weight vectors. The choice of the subscriber station 204.i weight vectors, however, needs to be conveyed to the subscriber station 204.i. Hence this weight vector information needs to be fed-forward to the individual subscriber station 204.i. Non-collaborative schemes, on the other hand, do not feed-forward information.

Feedback overhead—Both conventional collaborative and non-collaborative MIMO-SDMA systems require control channels to feedback MIMO channel information to the base station 202. While in the case of collaborative schemes the complete MIMO channel matrix needs to be fed back by each subscriber station 204.i, non-collaborative schemes which design the subscriber station 204.i beamforming combining vectors first need only feed back a vector corresponding to the projection of the subscriber station 204.i choice of a combining vector on to the MIMO channel matrix $H_i$. This considerably reduces the amount of feedback required with non-collaborative schemes.

The downsides of collaborative systems can be non-trivial in terms of adversely affecting performance not only in terms of the volume of control information exchanged, but also, for example, in fast changing channel conditions where the cost of an extra bit of control information may cost more than just the size of a bit. Further, in wideband systems, such as orthogonal frequency division multiple access (OFDMA) systems, the feed forward has to be done, in the worst case, on a per subcarrier basis which can significantly increase the overheads of communication.

However, designing optimal beamforming weight vectors and combining vectors for non-collaborative systems has proven to be an obstacle for conventional systems. To improve signal-to-interference plus noise ratios (SINRs), communication systems attempt to design weight and combining vectors so that transmission signal $x_i$ does not interfere with any other transmission signal. In a non-collaborative system, if you design the combining vector $v_i$ first, the subscriber station 204.i transmits data to the base station so that the base station is aware of the combining vector $v_i$. The base station 202 then designs the weight vector $w_i$ in light of the combining vector $v_i$. However, the combining vector $v_i$ might not yield the optimal design for the weight vector $w_i$. However, the combining vector $v_i$ cannot now change, because the weight vector $w_i$ would become incompatible. The weight vector $w_i$ can be designed first without knowing the combining vector $v_i$; however, an acceptably high SINR is not guaranteed. Thus, a "catch-22" develops.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A wireless communication system noncollaborative, multiple input, multiple output (MIMO) space division multiple access (SDMA) system determines subscriber station combining and weighting vectors that yield a high average signal-to-interference plus noise ratio (SINR). Each subscriber station independently transmits information to a base station that allows the base station to determine a weight vector $w_i$ for each subscriber station using the determined combining vector of the subscriber station. In at least one embodiment, the $i^{th}$ combining vector from the $i^{th}$ subscriber station is derived from or is generated to be substantially equivalent to a right singular vector corresponding to a maximum singular value of a channel matrix between a base station and the $i^{th}$ subscriber station. Each subscriber station transmits signals using a weight vector $\underline{v}_i$, and the weight vector $\underline{v}_i$ is derived from or is generated to be substantially equivalent to a left singular vector corresponding to a maximum singular value of a channel matrix between the $i^{th}$ subscriber station and the base station. The base station uses the weight vector $w_i$ to determine the signal transmitted by the $i^{th}$ subscriber station. In at least one embodiment, a resulting signal-to-interference plus noise (SINR) improvement results.

A channel matrix $H_i$ specifies the transmission channel gain between a transmitter and an $i^{th}$ receiver. In a noncollaborative, SDMA-MIMO system determining a combining vector $v_1$ in a receiver that corresponds to a right singular vector corresponding to a substantially maximal singular value of channel matrix $H_1$, and using the combining vector $v_1$ to determine the weight vector used to transmit signals to the receiver can improve the average SINR of the signals.

Figure 1:
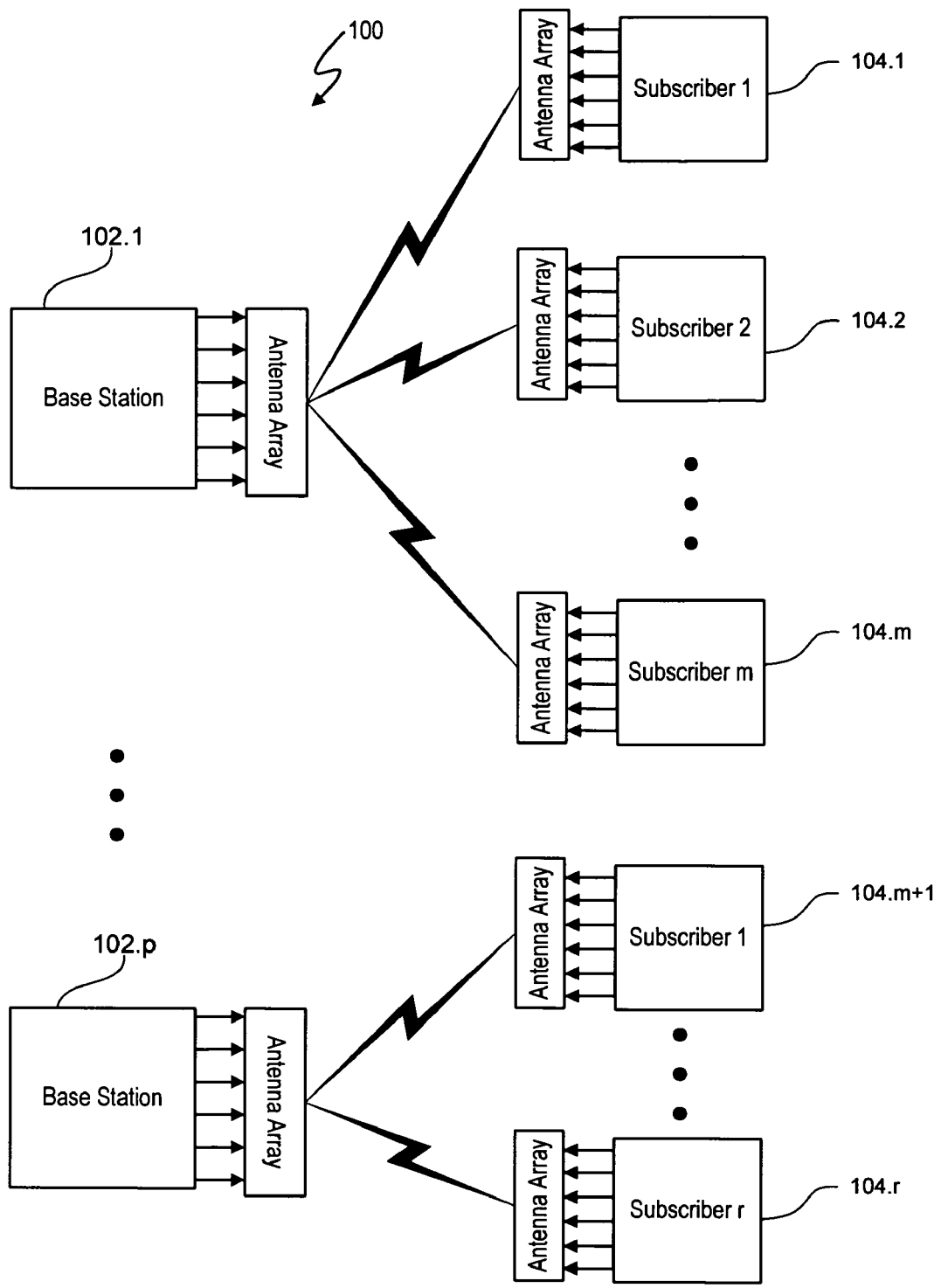
FIG. 1 (labeled prior art) depicts a wireless communication system that employs SDMA.
Figure 2:
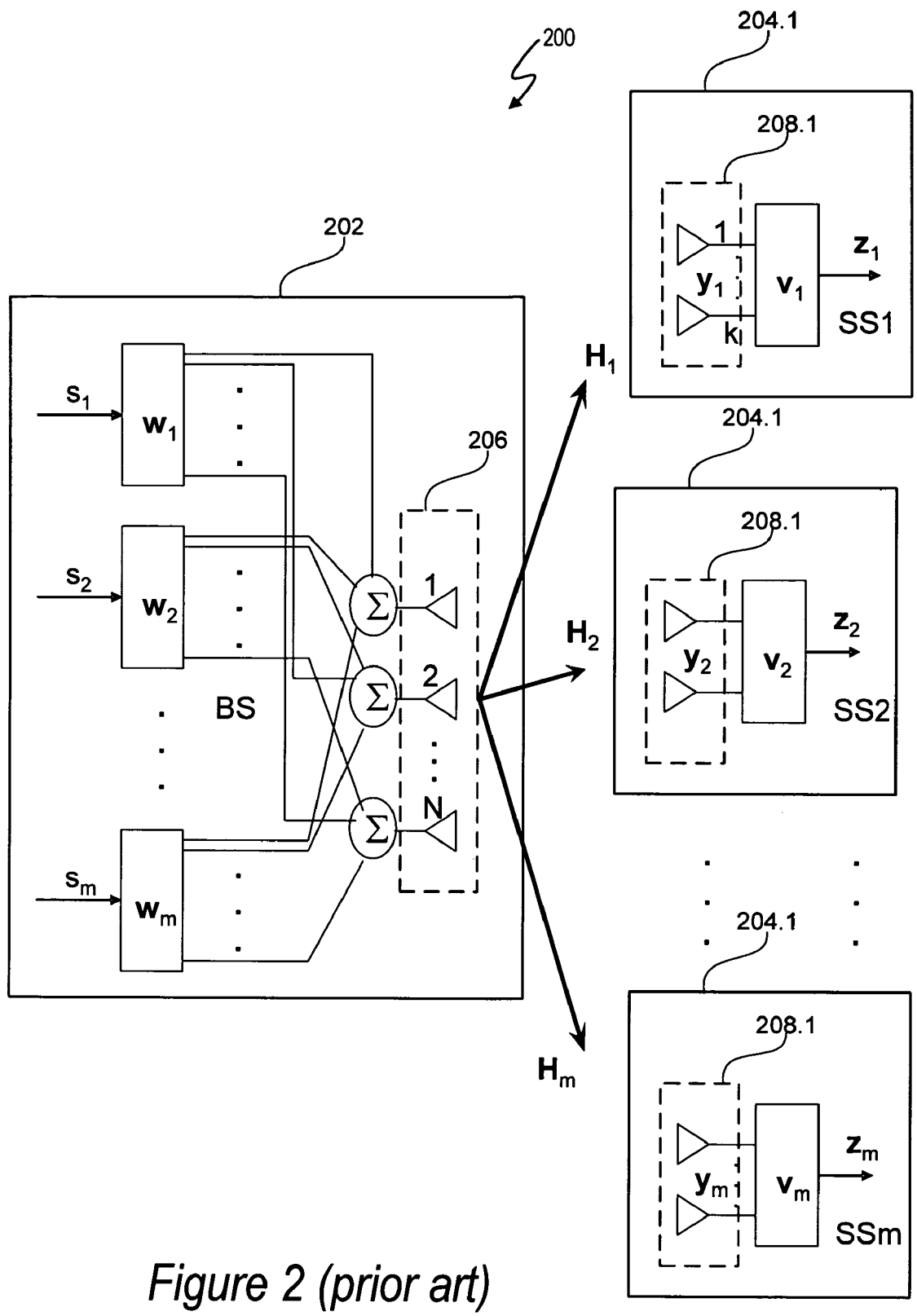
FIG. 2 (labeled prior art) depicts a base station and subscriber stations in an SDMA, MIMO wireless communication system.
Figure 3:
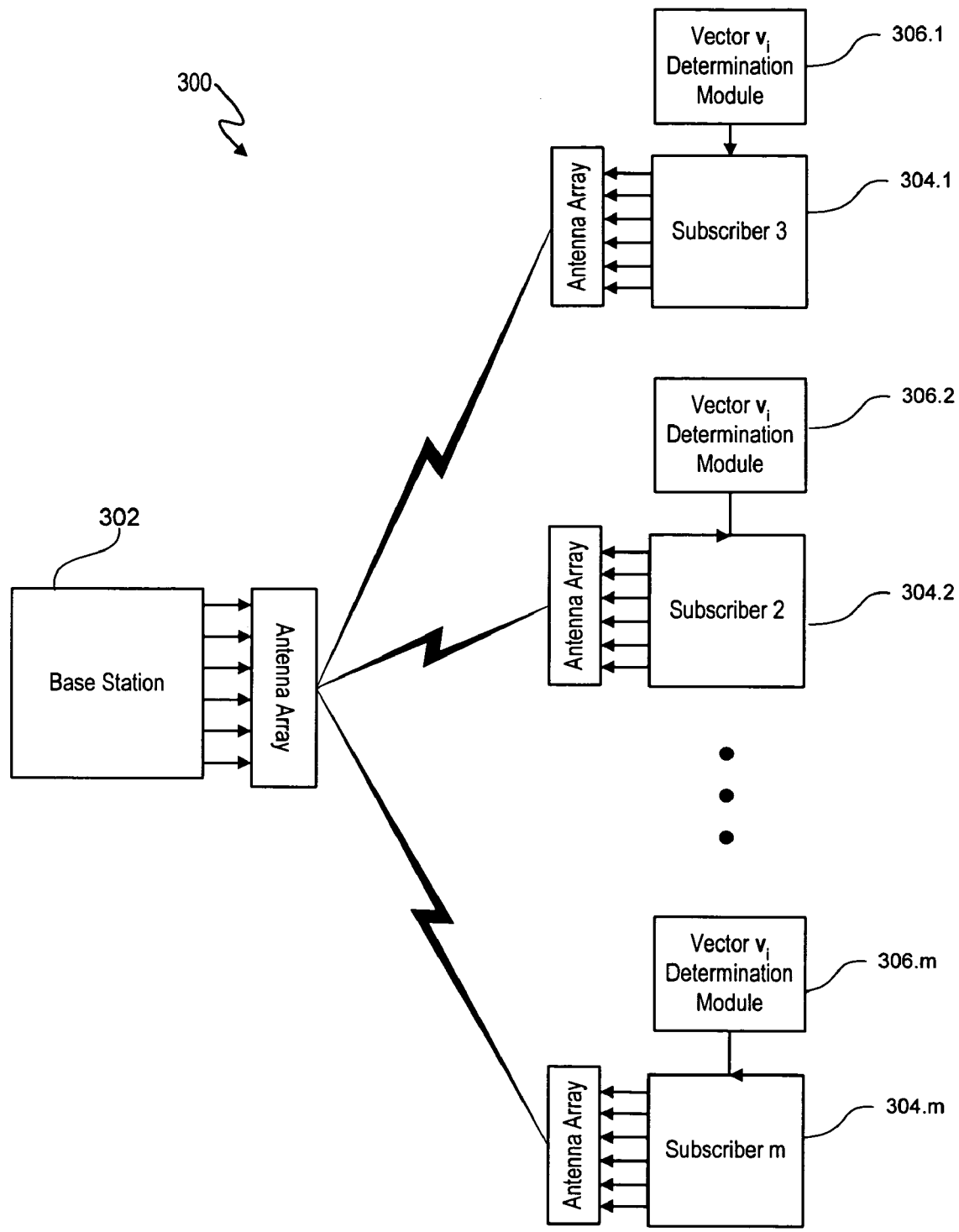
FIG. 3 depicts a wireless communication system with a base station and subscriber stations.

FIG. 3 depicts a wireless communication system 300 with a base station 302 and m subscriber stations 304.1 through 304.m. The wireless communication system 300 is a noncollaborative, MIMO-SDMA system. Thus, each base station 302 includes an array of multiple antennas for communicating with the subscriber stations 304.1 through 304.m, and each subscriber station includes respective antenna arrays for communicating with the base station 302. The number of antennas in the antenna arrays is station dependent. Preferably, the base station 302 includes at least as many antennas as the number of subscriber stations.

In at least one embodiment of wireless communication system 300, all of the m subscriber stations 304 include an independent combining vector v determination module 306 that independently determines respective combining vectors from an associated channel matrix H. In other embodiments, a subset of the m subscriber stations includes the independent combining vector v determination module 306. The $i^{th}$ subscriber station 304.i in wireless communication system 300 determines a combining vector $v_i$ from the channel matrix $H_i$ independently, without reference to any channel or weighting information from any other subscriber station, base station, or any other external data source. The subscriber station 304.i transmits information to the base station 302 that allows the base station to generate a weighting vector $w_i$ for use in transmitting signal $s_i$ to the subscriber station 304.i. The information transmitted to the base station 302 can be any information that allows the base station 302 to obtain or derive the combining vector $v_i$ and to generate the weighting vector $w_i$. For example, when the same channel matrix is used to transmit and receive, such as in a time division duplex (TDD) system, the subscriber station 304.i can transmit the combining vector $v_i$. The base station receives $H_i v_i$, and, knowing $H_i$, can derive the combining vector $v_i$ and determine weighting vector $w_i$.

In another embodiment, the channel matrices used for transmitting and receiving are different (e.g. $H_{iT}$ and $H_{iR}$, from the $i^{th}$ subscriber station's perspective), such as in a frequency division duplex (FDD) system. For the subscriber station 304.i to receive and the base station 302 to transmit, the subscriber station 304.i can, for example, feed back the combining vector $v_i$ and channel matrix $H_{iR}$ either separately or as a product to the base station 302. In at least one embodiment, the base station 302 can estimate the channel matrix $H_{iT}$ when the subscriber station 304.i transmits the product $H_{iT} \cdot v_i$ and/or the subscriber station 304.i transmits a known pilot sequence using vector $v_i$. The base station 302 receives $v_i$ and channel matrix $H_{iR}$, either separately or as a product, and, thus, can determine the combining vector $w_i$. In another embodiment, codes can be used to identify predetermined combining vectors. In at least one embodiment, the independent determination of the combining vector $v_i$ and subsequent determination of the base station weight vector $w_i$ using the combining vector $v_i$ result in an optimal average SINR over a period of time.

Figure 4:
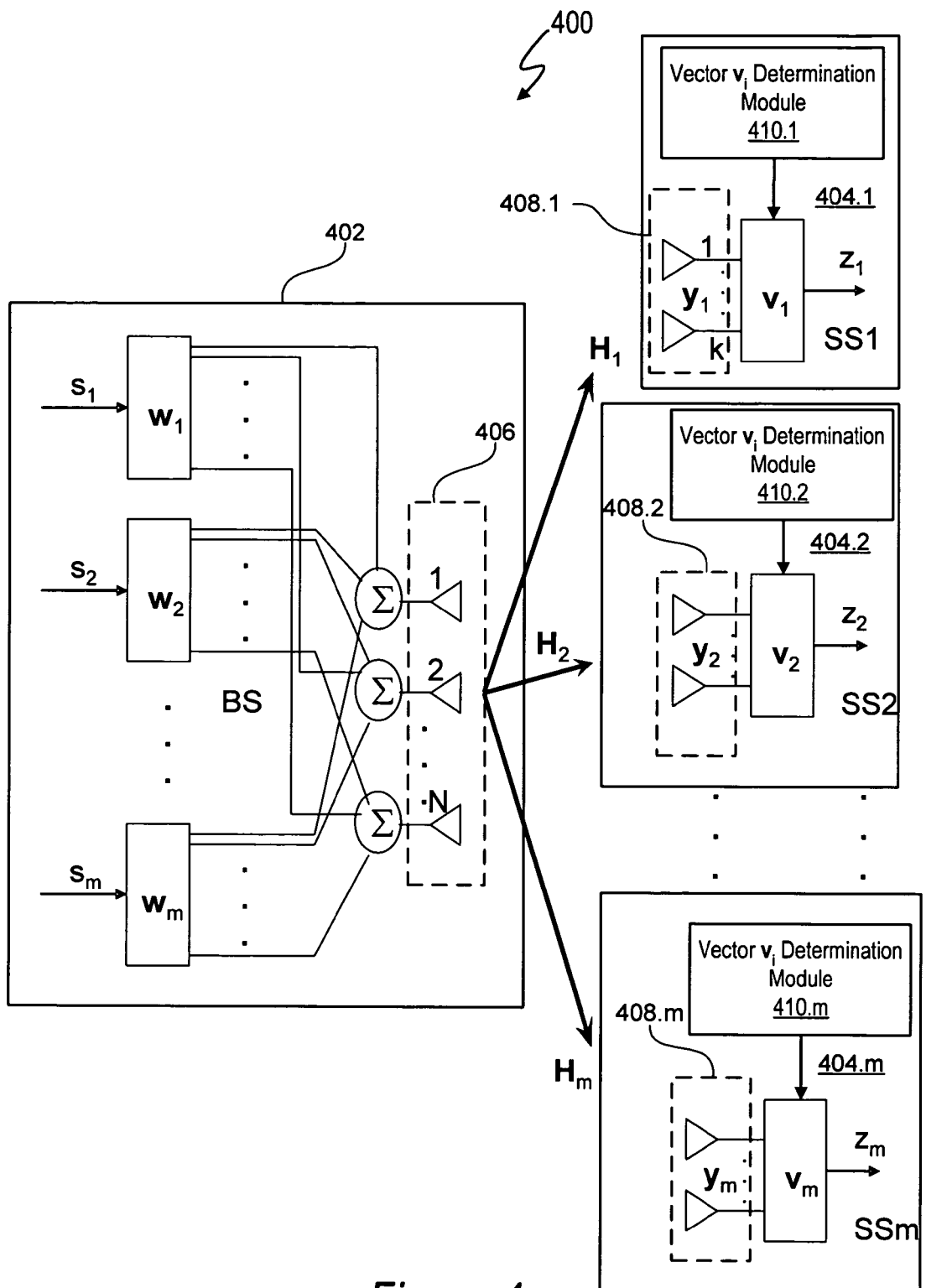
FIG. 4 depicts an embodiment of the wireless communication system in FIG. 3.

FIG. 4 depicts an embodiment of wireless communication system 300 in more detail. The wireless communication system 400 includes a base station 402 with an antenna array 406 of N antennas. The wireless communication system 400 also includes m different subscriber stations 404.1 through 404.m, each with an antenna array 408.1 through 408.m. The number of antennas in each subscriber station antenna array can vary between subscriber stations. The MIMO channel from the base station 402 to the $i^{th}$ subscriber station 404.i is denoted by $H_i$, $i \in \{1, 2, \ldots, m\}$. The channel matrix $H_i$ is an $N \times k_i$ matrix of complex entries representing the complex coefficients of the transmission channel between each transmit-receive antenna pair, where N represents the number of base station 402 antennas, and $k_i$ represents the number of antennas of the $i^{th}$ subscriber station.

A non-collaborative, SDMA-MIMO communication process between base station 402 and subscriber stations 404.1 through 404.m can be conceptually separated into an uplink process and a downlink process. In a downlink process, the base station 402 is the transmitter, N equals the number of antennas used for transmitting on the base station 402, and $k_i$ represents the number of antennas of the $i^{th}$ subscriber station 404.1 used to receive the transmitted signal. In an uplink process, the subscriber station 404.i is the transmitter, and the base station 402 is the receiver.

In a downlink process, the vector $v_i$ determination module 410.i determines a combining vector $v_i$ for combining the signals received by each of the $k_i$ antennas of subscriber station 404.i. The coefficients of vector $y_i$ represent each of the signals received by each of the $k_i$ antennas of subscriber station 404.i. In an uplink process, the vector $v_i$ determination module 410.i also determines a beamforming weighting vector $v_i$ for transmitting a signal from subscriber station 404.i to base station 402. In at least one embodiment, base station 402 and each of subscriber stations 404.1-404.m include a processor, software executed by the processor, and other hardware that allow the processes used for communication and any other functions performed by base station 402 and each of subscriber stations 404.1-404.m.

The uplink channel and the downlink channel may be the same or different depending upon the choice of communication scheme. For example, the uplink and downlink channels are the same for time division duplex (TDD) communication schemes and different for frequency division duplex (FDD) schemes.

Figure 5:
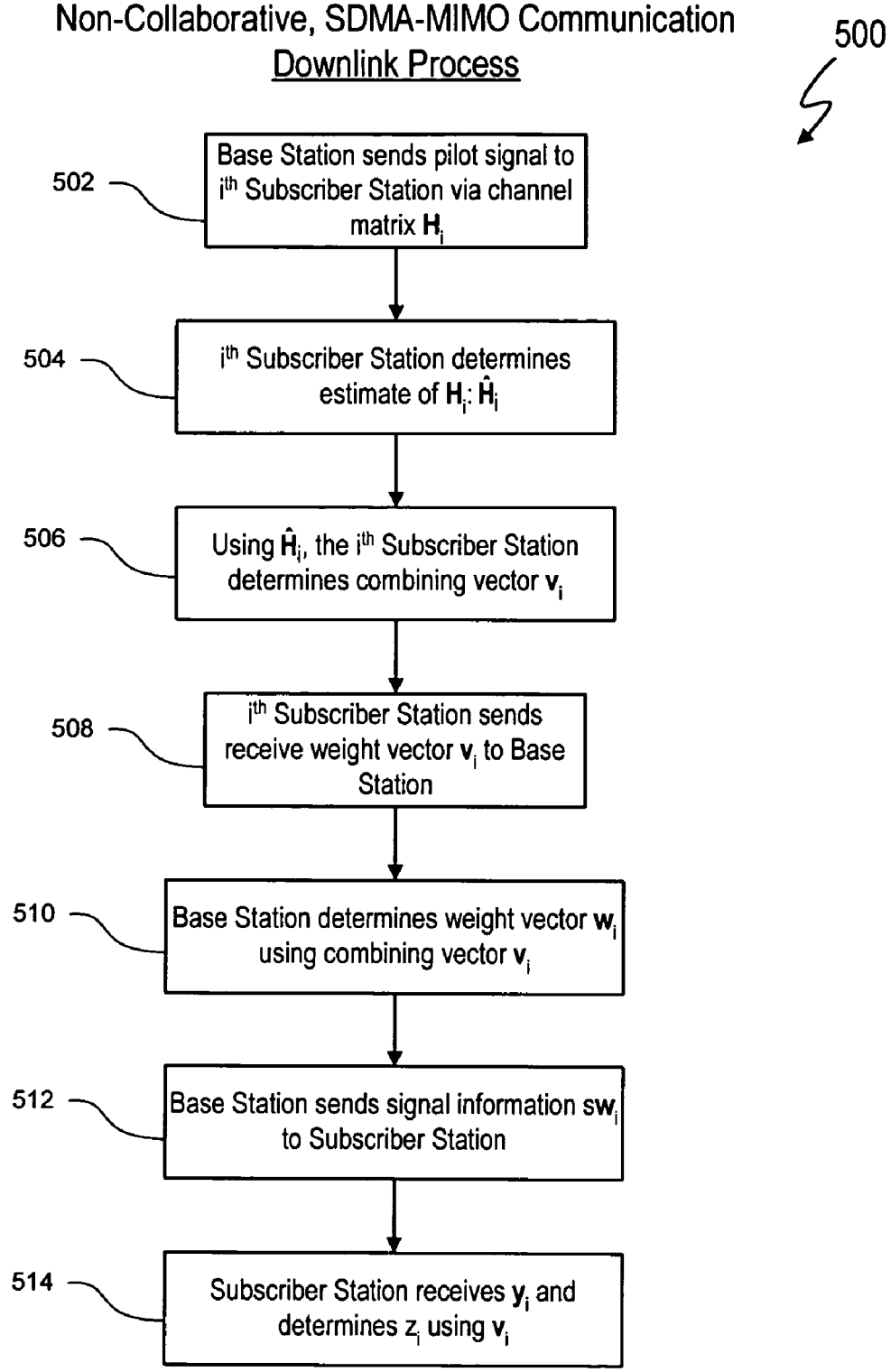
FIG. 5 depicts a non-collaborative, SDMA-MIMO downlink communication process.

FIG. 5 depicts a non-collaborative, SDMA-MIMO downlink communication process 500 that represents one embodiment of a downlink communication process between base station 402 and subscriber stations 404.1 through 404.m. Referring to FIGS. 4 and 5, in operation 502, the base station 402 transmits a pilot signal to each of subscriber stations 404.1-404.m. After reception of the pilot signal by the subscriber stations 404.1-404.m, using a pilot-based channel estimation technique, subscriber stations 404.1-404.m can respectively estimate channel matrices $\hat{H}_1$ through $\hat{H}_m$, where the "^" symbol indicates an estimated value. Pilot-based channel estimation techniques are well-known in the art.

In operation 506, for all i, vector $v_i$ determination module 410.i of the $i^{th}$ subscriber station 404.i uses the estimated channel matrix $\hat{H}_i$ to determine a combining vector $v_i$, $i \in \{1, 2, \ldots, m\}$. At least in the absence of interference generated by sources other than base station 402 and subscriber stations 404.1-404.m ("external noise interference"), the combining vector $v_i$ corresponds to the right singular vector corresponding to the maximal singular value of the estimated channel matrix $\hat{H}_i$. The right singular vector corresponding to the maximal singular value of the estimated channel matrix $\hat{H}_i$ can be determined from the maximum singular value decomposition of channel matrix $\hat{H}_i$. In at least one embodiment, the combining vector $v_i$ equals the right singular vector corresponding to the maximal singular value of the estimated channel matrix $\hat{H}_i$ as indicated in Equation [4]:

$$v_i = v_{SVD(rt)} = SV_{max}(\hat{H}_i)_{right} \quad [4].$$

The singular value decomposition of matrix $\hat{H}_i$ is determined using Equation [5]:

$$\hat{H}_i = UDV^H \quad [5].$$

where the $N \times k_i$ matrix D is a diagonal matrix that contains singular values on the diagonal and zeros off the diagonal, the matrix U is an $N \times N$ unitary matrix, and the matrix V is a $k_i \times k_i$ unitary matrix whose columns are the right singular vectors for the corresponding singular value in matrix D.

Thus, in accordance with Equations [4] and [5], the combining vector $v_i$ is the vector from the column in V corresponding to the maximum diagonal value in matrix D.

In at least one embodiment, the $i^{th}$ combining vector from the $i^{th}$ subscriber station is derived from or is generated to be substantially equivalent to a right singular vector corresponding to a maximum singular value of a channel matrix between a base station and the $i^{th}$ subscriber station. The combining vector $v_i$ corresponding to the right singular vector corresponding to the maximal singular value of the estimated channel matrix $\hat{H}_i$ can be determined using other processes. For example, the combining vector $v_i$ corresponding to the right singular vector corresponding to the maximal singular value of the estimated channel matrix $\hat{H}_i$ could be determined from the right singular vector corresponding to a non-maximal singular value of the estimated channel matrix $\hat{H}_i$ and using one or more factors to modify the result to at least substantially obtain $v_{SVD(rt)}$.

In at least one embodiment, the $i^{th}$ combining vector is designed in an environment where the channels $H_i$, $i \in \{1, 2, \ldots, m\}$, between the base station 402 and each subscriber station 404 are statistically independent of one another. This statistical independence represents the general case since any time the base station 402 would not select subscriber stations to share an SDMA burst profile if there is insufficient channel separation between the subscriber stations.

When external, statistical interference is present, the choice of the combining vector that will yield an improved SINR is determined using a comparison of the SINR from at least two combining vectors. In at least one embodiment, external statistical interference refers to interference whose characteristics can be estimated statistically. In the presence of external, statistical interference, the $i^{th}$ receiving subscriber station uses available information about the interference to determine the combining vector $v_i$. The vector $v_i$ determination module 410.i determines which combining vector provides the best SINR. In at least one embodiment, two types of interference are considered. The first type is instantaneous interference with an instantaneous interference measure $b_I$. The instantaneous interference measure $b_I$ is a $k \times 1$ vector with the $j^{th}$ entry in the $b_I$ representing instantaneous, external noise on the $j^{th}$ antenna $j \in \{1, 2, \ldots, k\}$. The second type of interference is statistical interference with an average, external interference represented by a zero mean with covariance matrix $R_I$.

In at least one embodiment, vector $v_i$ determination module 410.i chooses $v_i = v_{SVD}$ as defined by Equation [4] during at least a first period of time and chooses $v_i = v_{null(I \text{ or } S)}$ during at least a second period of time depending upon whether $v_{SVD}$ or $v_{null}$ provide a better SINR, wherein the subscripts "I" and "S" respectively signify vectors determined for instantaneous and statistical interference. For instantaneous interference, for $C > 0$ $v_i = v_{nullI}$, and otherwise $v_i = v_{SVD}$, where C for instantaneous interference is defined in at least one embodiment by Equation [6]:

$$C = \|H_1 v_{nullI}\|^2 - \frac{\sigma_n^2}{\sigma_n^2 + \frac{1}{k}\|b_I\|^2} \|H_1 v_{SVD}\|^2, \quad [6]$$

where:

$$T^H = Null(b_I);$$

$$v_{nullI} = T \cdot SV_{max}(T^H H_1^H H_1 T);$$

$$v_{SVD} = SV_{max}(H_i); \text{ and}$$

$\sigma_n^2$ represents noise variance measured during a time of no transmission. $T^H$ equals the complex conjugate of the null space of vector $b_I$. Vector $b_I$ is an N dimensional vector representing instantaneous interference. The null space of matrix T is, thus, the set of N−1 vectors which satisfy $T^H b_I = 0$.

The left entry on the right hand side of Equation [6] represents the signal-to-noise ratio (SNR) obtained using $v_{nullI}$, and the right entry represents the SNR obtained using vector $v_{SVD}$.

For statistical interference, for $C > 0$ $v_i = v_{nullS}$, and otherwise $v_i = v_{SVD}$, where C for statistical interference is defined in at least one embodiment by Equation [7]:

$$C = \|H_1 v_{nullS}\|^2 - \frac{\sigma_n^2}{\sigma_n^2 + \frac{1}{k}\|tr(R_I)\|^2} \|H_1 v_{SVD}\|^2; \quad [7]$$

where:

$$T = T = R_I^{1/2} = U\Sigma^{1/2};$$

$$v_{nullI} = T \cdot SV_{max}(T^H H_1^H H_1 T);$$

$$v_{SVD} = SV_{max}(H_i);$$

$R_I = R_I = U\Sigma U^H$, which is the eigen value decomposition of covariance matrix $R_I$, and covariance matrix $R_I$ represents statistical interference, zero mean, $$R_I^{1/2} = U\Sigma^{1/2},$$

$tr(R_I)$ is the trace matrix of matrix $R_I$, and $\sigma_n^2$ represents noise variance measured during a time of no transmission.

The left entry on the right hand side of Equation [7] represents the signal-to-noise ratio (SNR) of vector $v_{nullS}$, and the right entry represents the SNR of vector $v_{SVD}$.

In operation 508, once the combining vector $v_i$ is determined, the subscriber station 404.i transmits information to the base station 402 that allows the base station 402 to generate a weight vector $w_i$ that is complimentary to the combining vector $v_i$ and, thus, at least in the absence of external interference, provides a SINR improvement over conventional systems. As described above, in at least one embodiment, when the same channel matrix H is used to transmit and receive, such as in a TDD system, the subscriber station 404.i transmits the combining vector $v_i$ to the base station 404 via channel $H_i$. The base station receives $H_i v_i$, and, knowing $H_i$, can derive the combining vector $v_i$ and determine a complimentary weighting vector $w_i$ as subsequently described. In another embodiment, when the channel matrices used for transmitting and receiving are different (e.g. $H_{iT}$ and $H_{iR}$, from the $i^{th}$ subscriber station's perspective), such as in an FDD system, in at least one embodiment, the subscriber station 304.i can transmit the combining vector $v_i$ and channel matrix $H_{iR}$. The base station 302 receives $H_{iT} H_{i/R} v_i$, and, thus, can determine the combining vector $w_i$ from $H_{iT} H_{i/R} v_i$. In another embodiment of FDD, the base station 302 can determine an estimate of the channel matrix $H_{iR}$ and $H_{iT}$ in for example, a well-known manner, and the subscriber station 304.i transmits only the combining vector $v_i$. The base station 302 can then determine the combining vector from $H_{iT} v_i$. In another embodiment, codes correlated to a set of predetermined combining vectors or codes representing the combining vector $v_i$ can be used to determine combining vector $v_i$. In a non-collaborative system, the vector $v_i$ determination module 410.i determines the $i^{th}$ combining vector $v_i$ independently of the weight vector $w_i$ of base station 402 and independently of the combining vectors of any other subscriber station.

In operation 510, the base station 402 determines the transmit beamforming weight vector $w_i$ that is complimentary to combining vector $v_i$. The base station 402 determines the weight vector $w_i$ with the goal of eliminating cross-channel interference. In a normalized context, the cross-channel interference can be eliminated by designing the complimentary weight vector $w_i$ using combining vector $v_i$ in accordance with Equation [8]:

$$w_i^H H_j v_j = \begin{cases} 1 & \text{If } i = j \\ 0 & \text{If } i \neq j \end{cases}. \quad [8]$$

In at least one embodiment, the weight vector $w_i$ is complimentary to combining vector $v_i$ when Equation [8] is satisfied.

The method used in operation 510 to determine the weight vector $w_i$, and, thus, spatially separate the subscriber stations 404.1-404.m is a matter of design choice. In at least one embodiment, the linearly constrained minimum variance (LCMV) algorithm is employed at the base station 404 to determine complimentary weight vector $w_i$.

Following is a general description of application of the LCMV applied in at least one embodiment of operation 510 to determine the weight vector $w_i$ using the combining vector $v_i$ from subscriber station 404.i. The base station 402 has N antennas and transmits to m subscriber stations 404 where, preferably, $m \leq N$. The complex vector channels seen by the base station 404 to each of the m subscriber stations 404 are represented by $h_1, h_2, \ldots, h_m$, where $h_i = \hat{H}_i v_i$, and $X = [h_1, h_2, \ldots, h_m]$.

A general goal of an SDMA-MIMO communication system is to design a set of m, N-dimensional beamforming vectors $w_i$, $i \in \{1, 2, \ldots, m\}$ corresponding to each subscriber station 404 so that the transmission to one subscriber station has minimal interference with transmission to other subscriber stations while achieving a specified gain to the intended recipient subscriber station. For the sake of simplicity, assume that the specified gain of a signal intended for a subscriber station is unity and that the gains to other subscriber stations are zero to ensure no intra-system interference. Then the design constraint for the weight vectors can be specified in accordance with Equation [9]:

$$X^H W = D \quad [9]$$

where $D = Im$, $Im$ is an $m \times m$ identity matrix, and $$W = [w_1, w_2, \ldots, w_m] \quad [10],$$

where $w_i$, $i \in \{1, 2, \ldots, m\}$, represents the weight vector used for beamforming transmission to the $i^{th}$ subscriber station 404.i. Equation [9] can be posed as an LCMV problem in the following manner:

$$w_i = \underset{w}{\arg\min}(w^H w) \quad [11]$$

such that:

$$X^H w = e_i \quad [12]$$

where $e_i$ is the all-zero column vector except for the $i^{th}$ entry which is equal to one.

The LCMV solution solves a least squares problem which is the minimum transmit power solution for the signal transmitted to subscriber station 404.i while meeting the given gain and interference constraints. Another way to view the LCMV solution is to look at the signal-to-noise ratio (SNR) obtained with unit (normalized) transmit power. If the signal power is $\sigma_s^2$ and the noise power is $\sigma_n^2$, the SNR obtained for subscriber station 404.i for weight vector $w_i$ is given by:

$$SNR_i = \frac{1}{w_i^H w_i} \frac{\sigma_s^2}{\sigma_n^2}. \quad [13]$$

The LCMV solution maximizes the $SNR_i$ that can be obtained by subscriber station 404.i with a fixed transmit power (normalized to one (1) in this case) under the given constraints. In at least one embodiment, differential gains/SNR to different subscriber stations can be ensured by setting different values for the elements of the diagonal matrix D in Equation [9].

In at least one embodiment of operation 512, the base station 402 transmits m different signals to the m subscriber stations 404.1-404.m on the same time-frequency channel. The modulated data to be transmitted to subscriber station 404.i is denoted by $s_i$. Each of the m signals $s_1$ through $s_m$ are transmitted through all the N base station 402 antennas 408 using unique complex antenna weights $w_1$ through $w_m$. In at least one embodiment, the actual signal transmitted on each base station 402 antenna is a superposition of vectors $x_1$ through $x_m$, where $x_i = s_i w_i$ and $i \in \{1, 2, \ldots, m\}$.

Subscriber station 404.1 has $k_1$ antennas in antenna array 406.1. In operation 514, the subscriber station 404.1 receives signal vector $y_1$. In at least one embodiment, for subscribers station 404.1, signal vector $y_1$ is defined by Equation [14]:

$$y_1 = s_1 \hat{H}_1^H w_1 + \sum_{i=2}^{m} s_i \hat{H}_1^H w_i + n, \quad [14]$$

where "$s_1$" the data to be transmitted to subscriber station 404.1, "$\hat{H}_1^H$" represents the complex conjugate of the estimated channel matrix $\hat{H}_i$, $w_i$ is the $i^{th}$ beamforming, N dimensional weighting vector, and the vector n represents external noise interference for $i \in \{1, 2, \ldots, m\}$. The superscript "H" is used herein to represent a complex conjugate operator. The $j^{th}$ element of the received signal vector $y_i$ represents the signal received on the $j^{th}$ antenna of subscriber station 404.i, $j \in \{1, 2, \ldots, k\}$. Equation [14] can be used for all $y_i$ by letting the first term on the right hand side of RHS of Equation [14] be the desired receive signal while the summation terms represent co-channel interference.

The subscriber station 404.i then weights and sums the receive signal vector $y_i$ using the combining vector $v_i$ used by base station 402 to generate $w_i$ to determine the desired output data signal $z_i$, which is an estimate of the transmitted data signal $s_i$, in accordance with Equation [15]:

$$z_i = \hat{s}_i = v_i^H y_i \quad [15].$$

Figure 6:
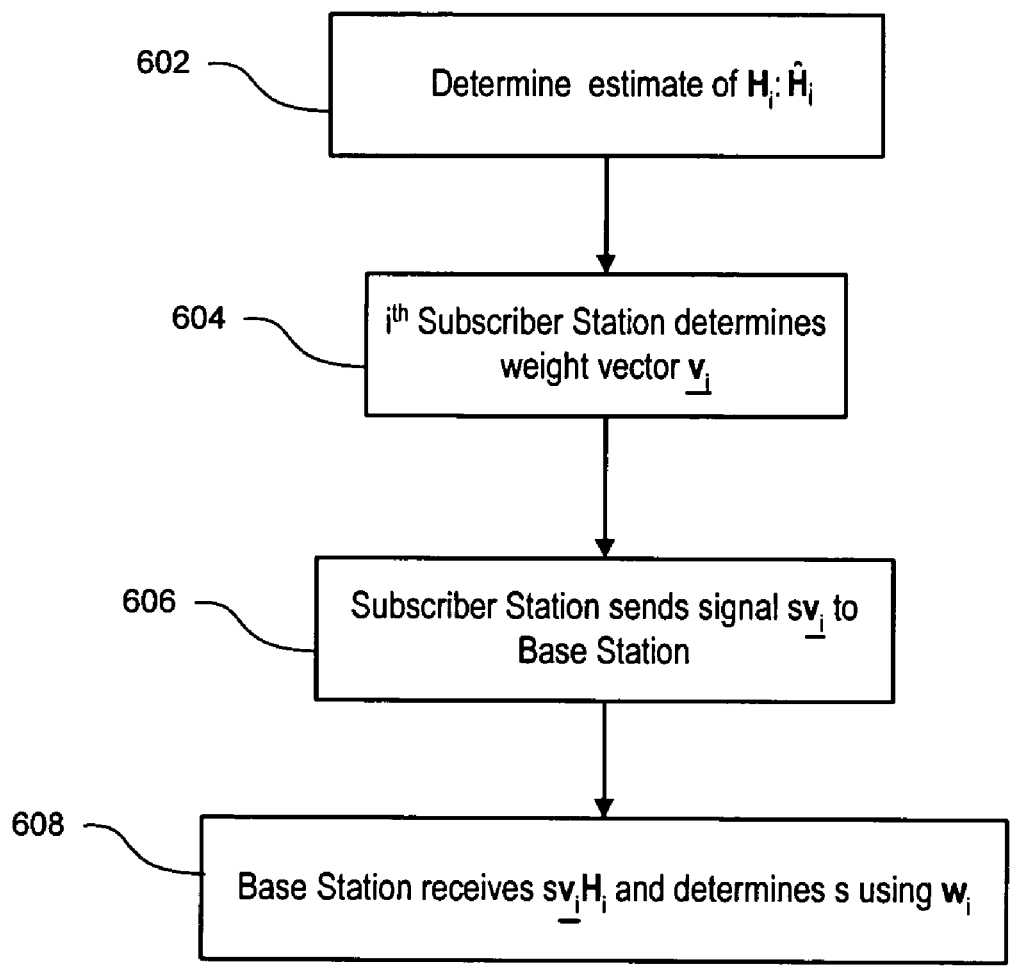
FIG. 6 depicts a non-collaborative, SDMA-MIMO uplink communication process.

FIG. 6 depicts a non-collaborative, SDMA-MIMO uplink communication process 600 that represents one embodiment of an uplink communication process between base station 402 and subscriber stations 404.1 through 404.m. In operation 602, the base station determines an estimate of the uplink channel matrix $\hat{H}_1$ if the uplink channel matrix $\hat{H}_1$ is not already known to the base station 402. In some communication processes, such as the TDD process, the estimated uplink channel matrix $\hat{H}_1$ corresponds directly to the estimated downlink channel matrix $\hat{H}_i$. If the base station 402 does not know the uplink channel process, in one embodiment, operation 602 determines uplink channel matrix $\hat{H}_1$ in the same manner as operation 502 except that the roles of the subscriber stations 404.1-404.m and the base station 402 are reversed.

In operation 604, during transmission by subscriber station 404.i, vector $v_i$ determination module 410.i determines a weight vector $\underline{v}_i$. The weight vector $\underline{v}_i$ corresponds to the left singular vector corresponding to the maximal singular value of the $k_i \times N$ estimated uplink channel matrix $\hat{H}_i$ as indicated by Equation [16]:

$$\underline{v}_i = v_{SVD(left)} = SV_{max}(\hat{H}_i)_{left}. \quad [16]$$

The singular value decomposition of matrix $H_i$ is determined using Equation [17]:

$$\hat{H}_i = UDV^H \quad [17].$$

where the $N \times k_i$ matrix D is a diagonal matrix that contains singular values on the diagonal and zeros off the diagonal, the matrix U is an $N \times N$ unitary matrix whose columns are the left singular vectors for the corresponding singular value in matrix D, and the matrix V is a $k_i \times k_i$ unitary matrix.

Thus, in accordance with Equations [16] and [17], the weight vector $\underline{v}_i$ is the vector from the column in U corresponding to the maximum diagonal value in matrix D.

In at least one embodiment, the $i^{th}$ weighting vector from the $i^{th}$ subscriber station is derived from or is generated to be substantially equivalent to a left singular vector corresponding to a maximum singular value of a channel matrix between a base station and the $i^{th}$ subscriber station. In at least one embodiment, the weight vector $\underline{v}_i$ corresponding to the left singular vector corresponding to the maximal singular value of the estimated channel matrix $\hat{H}_i$ can be determined using other processes. For example, the weight vector $\underline{v}_i$ corresponding to the left singular vector corresponding to the maximal singular value of the estimated channel matrix $\hat{H}_i$ could be determined from the left singular vector corresponding to a non-maximal singular value of the estimated channel matrix $\hat{H}_i$ and using one or more factors to modify the result to at least substantially obtain $v_{SVD(left)}$.

In operation 606, subscriber station 404.i sends a signal $s_i$ $\underline{v}_i$ to base station 402.

In operation 518 for TDD, the base station estimates $s_i$ using weight vector $w_i$, which is the same as the weight vector $w_i$ used during the downlink process, Assuming that the received signal is the vector $\underline{y}_i$, signal vector $\underline{y}_i$ is defined by Equation [18]:

$$\underline{y_1} = s_1 \hat{H}_1^H v_1 + \sum_{i=2}^{m} s_i \hat{H}_1^H v_n + n; \quad [18]$$

where "$s_1$" the data to be transmitted to base station 402, "$\hat{H}_i^H$" represents the complex conjugate of the estimated channel matrix $\hat{H}_i$, $v_i$ is the beamforming weight vector of subscriber station 404.1 $i^{th}$ beamforming, N dimensional weighting vector, and n represents external noise interference for $i \in \{1, 2, \ldots, m\}$. The superscript "H" is used herein to represent a complex conjugate operator. The $j^{th}$ element of the received signal vector $\underline{y}_i$ represents the signal received on the $j^{th}$ antenna of base station, $j \in \{1, 2, \ldots, N\}$. The first term on the right hand side of RHS of Equation [14] is the desired receive signal while the summation terms represent co-channel interference.

In operation 608, the base station 404 then weights and sums the receive signal vector $\underline{y}_i$ using the weight vector $w_i$ form the desired output data signal, $z_i$, that estimates the transmitted signal $s_i$ in accordance with Equation [15]:

$$z_i = \hat{s}_i = w_i^H \underline{y}_i \quad [19].$$

Figure 7:
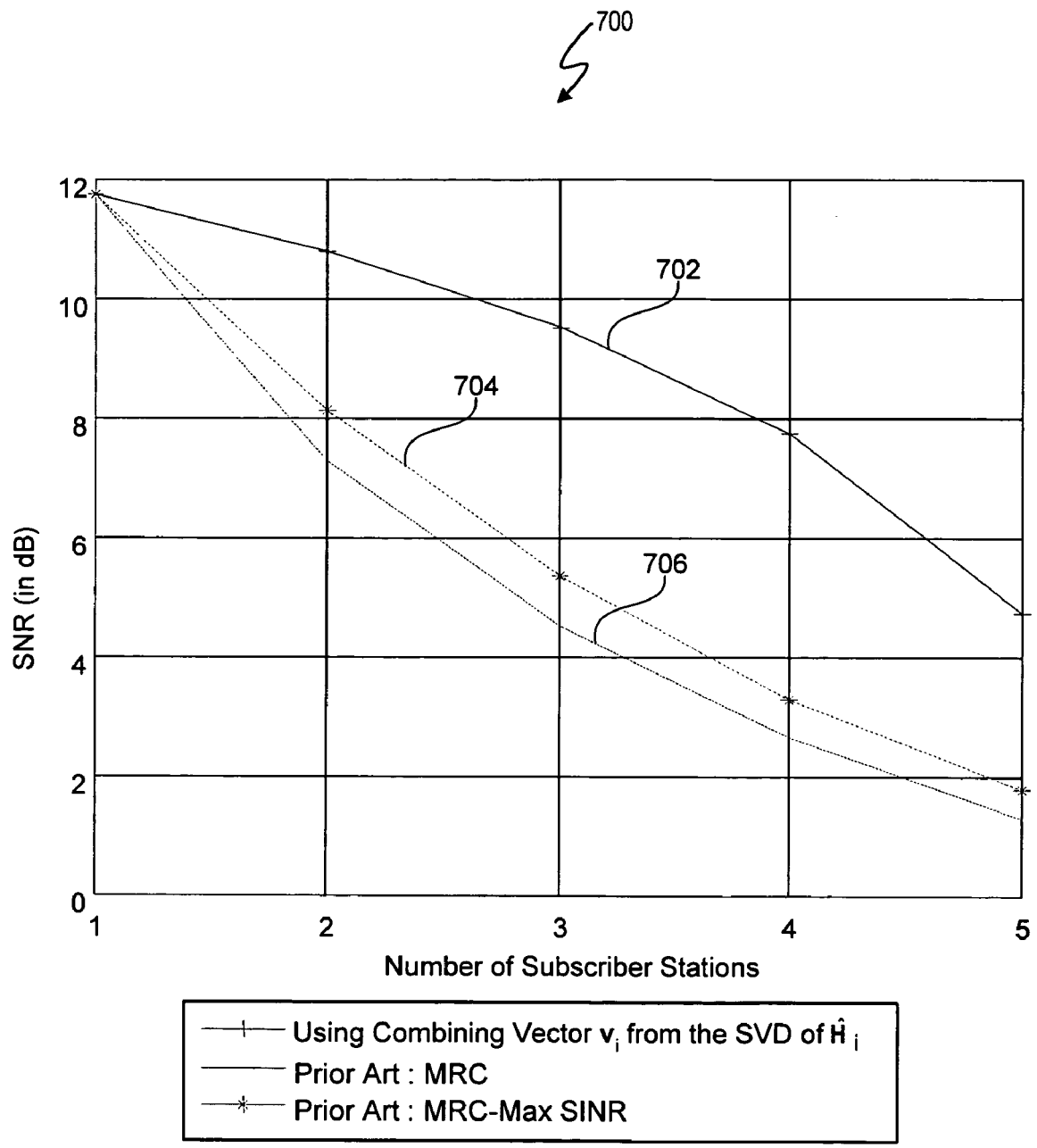
FIG. 7 depicts a simulated comparison of the wireless system in FIG. 4 and conventional systems.

FIG. 7 depicts a simulated comparison 700 between wireless communication in wireless communication system 400 using non-collaborative, SDMA-MIMO communication process 500 and conventional maximal ratio combining (MRC) processes. For the simulation, the number of base station transmit antennas N=5, and, for each subscriber station, the number of receive antennas k=2. The results are shown for a variable number of subscriber stations. The curve 702 depicts the SNR achieved using non-collaborative, SDMA-MIMO communication process 500. The curve 704 depicts the SNR achieved using MRC, and the curve 707 depicts the SNR achieved using MRC with maximum SINR. The curve 702 depicts a 3-4 dB gain when transmitting to multiple subscriber stations.

Figure 8:
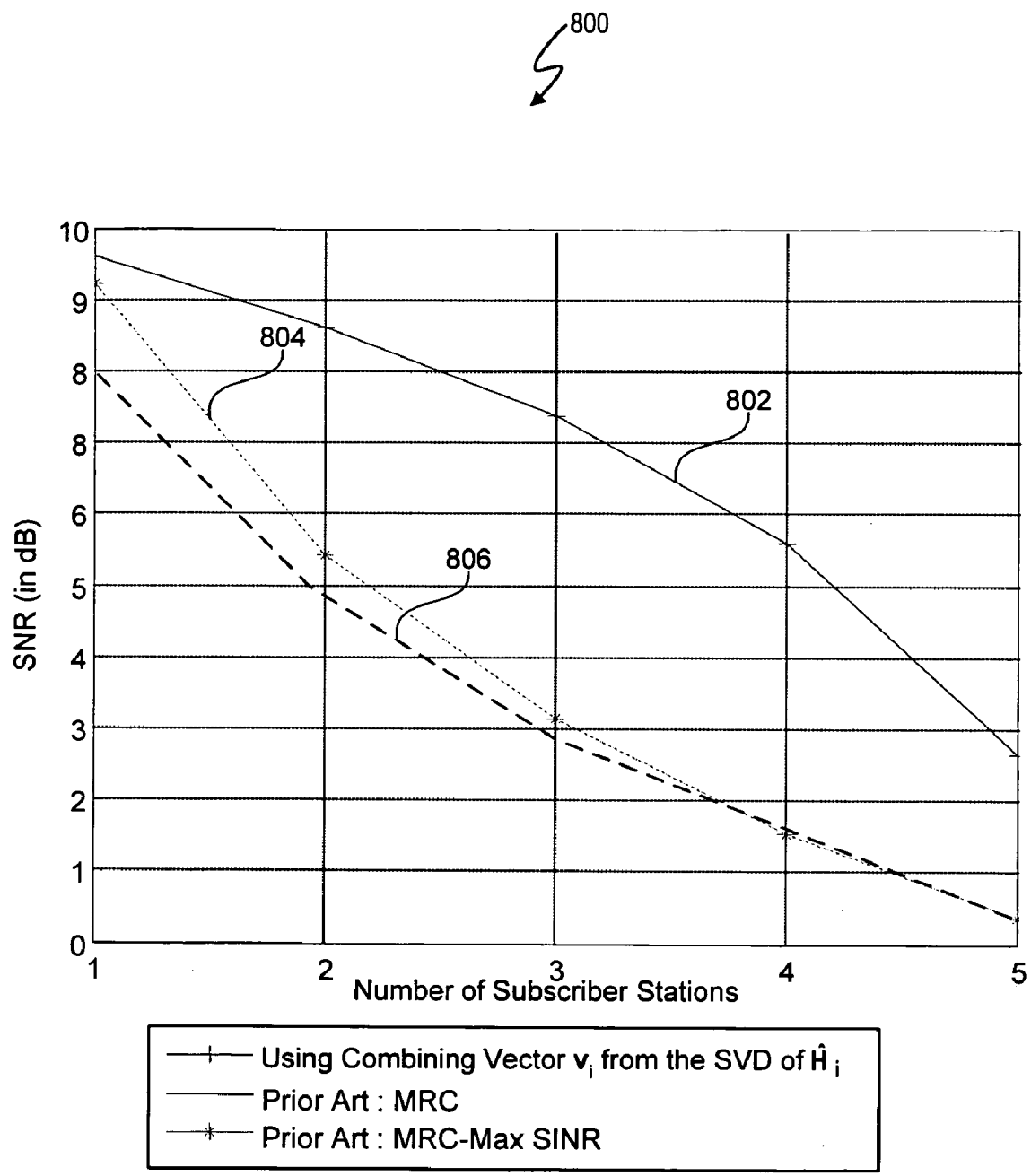
FIG. 8 depicts a simulated comparison of the wireless system in FIG. 4 and conventional systems in the presence of statistical interference.

FIG. 8 depicts a simulated comparison 800 between wireless communication in wireless communication system 400 when determining $v_i$ in the presence of external statistical interference and conventional maximal ratio combining (MRC) processes. For the simulation, the number of base station transmit antennas N=5, and, for each subscriber station, the number of receive antennas k=2. The results are shown for a variable number of subscriber stations. The curve

702 depicts the SNR achieved using non-collaborative, SDMA-MIMO process of determining $v_i$ in the presence of statistical interference. The curve 804 depicts the SNR achieved using MRC, and the curve 808 depicts the SNR achieved using MRC with maximum SINR. The curve 802 depicts a 3-4 dB gain.

Although the present invention has been described in detail, it should be understood that various changes, substitutions and alterations can be made hereto without departing from the spirit and scope of the invention as defined by the appended claims.

What is claimed is:

1. A wireless communication method using beamforming for a noncollaborative, multiple input, multiple output (MIMO) space division multiple access (SDMA) system, the method comprising:
   receiving signals on k multiple antennas of a first device, wherein "k" is an integer greater than one (1);
   during at least a first period of time, combining the signals using a combining vector $v_1$, wherein the combining vector $v_1$ corresponds to a right singular vector corresponding to a substantially maximal singular value of channel matrix $H_1$, wherein $H_1$ represents a channel between the first device and a second device;
   during at least the first period of time, determining a data signal using the combining vector $v_1$; and
   transmitting information to a second device that allows the second device to use the combining vector $v_1$ to design a weight vector.

2. The method of claim 1 further comprising:
   transmitting a signal to the second device using a weight vector $\underline{v_1}$, wherein the weight vector $\underline{v_1}$ corresponds to a left singular vector corresponding to the maximal singular value of an uplink channel matrix $H_i$.

3. The method of claim 1 further comprising:
   determining whether the combining vector $v_1$ or a combining vector $v_A$ provides better signal-to-interference plus noise ratio; and
   during at least a second period of time, determining the data signal using the combining vector $v_1$ if the combining vector $v_1$ provides a better signal-to-interference plus noise ratio and otherwise determining the combined signal using the combining vector $v_A$.

4. The method of claim 3 wherein the combining vector $v_A$ is determined based on statistical interference and instantaneous interference.

5. The method of claim 1 further comprising:
   determining the combining vector $v_1$ using a processor of the first device.

6. The method of claim 1 further comprising:
   determining the combining vector $v_1$ independently of combining vectors and channel matrices of all other devices in the MIMO-SDMA system.

7. The method of claim 1 wherein $y_1$ is a k element reception vector for the first device, $w_i^H$ is an N element, conjugate transpose of a signal weighting vector $w_1$, $y_1 = s_1 \hat{H}_1^H w_1 +$ interference, $z_1$ represents the combined signal, and determining the data signal using the combining vector $v_1$ comprises:
   determining a dot product of a conjugate transpose of the combining vector $v_1$ and the reception vector $y_1$ such that $z_1 = v_1^H y_1$ and "$z_1$" represents the data signal.

8. The method of claim 1 wherein the information transmitted to the second device allows the second device to use the combining vector $v_1$ to generate a weight vector for transmission of signals from the second device to the first device.

9. The method of claim 1 wherein the first device is selected from the group comprising cellular telephones, wireless equipped computer systems, and wireless personal digital assistants.

10. A subscriber station comprising:
    a receiver to receive beam formed signals on k antennas of a first receiver, wherein "k" is an integer greater than one;
    a module to combine the signals using a combining vector $v_1$ to determine a data signal, wherein during at least a first period of time, the combining vector $v_1$ corresponds to a right singular vector corresponding to a substantially maximal singular value of channel matrix $H_1$, wherein $H_1$ represents a channel between the first receiver and a base station; and
    a transmitter to transmit information to a multiple antenna base station that allows the base station to use the combining vector $v_1$ to design a weight vector.

11. The subscriber station of claim 10 wherein the transmitter is further capable of transmitting a signal to the base station using a weight vector $\underline{v_1}$, wherein the weight vector $\underline{v_1}$ corresponds to a left singular vector corresponding to the maximal singular value of an uplink channel matrix $H_i$.

12. The subscriber station of claim 10 wherein channel matrix $H_1$ is an estimate of an actual channel matrix, and the coefficients of channel matrix $H_i$ represent channel gains.

13. The subscriber station of claim 10 further comprising:
    a determination module to determine whether the combining vector $v_1$ or a combining vector $v_A$ provides better signal-to-interference plus noise ratio and to determine, during at least a second period of time, the data signal using the combining vector $v_1$ if the combining vector $v_1$ provides a better signal-to-interference plus noise ratio and otherwise determining the combined signal using the combining vector $v_A$.

14. The subscriber station of claim 13 wherein the combining vector $v_A$ is determined based on statistical interference and instantaneous interference.

15. The subscriber station of claim 10 further comprising:
    a module to determine the combining vector $v_1$ using a processor of the first receiver.

16. The subscriber station of claim 10 further comprising:
    a module to determine the combining vector $v_1$ independently of combining vectors and channel matrices of all other subscriber stations.

17. The subscriber station of claim 10 wherein $y_1$ is a k element reception vector for the first receiver, $w_i^H$ is an N element, conjugate transpose of a signal weighting vector $w_1$, $y_1 = s_1 \hat{H}_1^H w_1 +$ interference, and to determine the data signal using the combining vector $v_1$, the module to combine the signals is further capable of:
    determining a dot product of a conjugate transpose of the combining vector $v_1$ and the reception vector $y_1$ such that $z_1 = v_1^H y_1$, wherein "$z_1$" represents the data signal.

18. The subscriber station of claim 10 wherein the information transmitted to the base station that allows the base station to use the combining vector $v_1$ comprises data from which the combining vector $v_1$ can be derived.

19. The subscriber station of claim 10 wherein the subscriber station is selected from the group comprising cellular telephones, wireless equipped computer systems, and wireless personal digital assistants.

20. A wireless communication method using beamforming for a noncollaborative, multiple input, multiple output (MIMO) space division multiple access (SDMA) system, the method comprising:

determining a weight vector $\underline{v}_1$ corresponding to a left singular vector corresponding to a substantially maximal singular value of channel matrix $H_1$, wherein $H_1$ represents a channel between a first device and a second device;

transmitting information to the second device from the first device that allows the second device to use a combining vector $v_1$ corresponding to a right singular vector corresponding to a substantially maximal singular value of channel matrix $H_1$ to design a weight vector $w_1$; and transmitting a signal to the second device using the weight vector $\underline{v}_1$.

* * * * *